United States Patent [19]

LeMay

[11] Patent Number: 4,642,540
[45] Date of Patent: Feb. 10, 1987

[54] ROBOT CONTROL SYSTEMS

[75] Inventor: Christopher A. G. LeMay, Osterley, England

[73] Assignee: EMI Limited, Hayes, England

[21] Appl. No.: 547,966

[22] Filed: Nov. 2, 1983

[30] Foreign Application Priority Data

Nov. 4, 1982 [GB] United Kingdom ................ 8231553

[51] Int. Cl.$^4$ ............................................. G05B 19/10
[52] U.S. Cl. ................................... 318/568; 318/591; 364/181; 364/191
[58] Field of Search ............... 318/568, 569, 591, 561, 318/567, 570, 578, 575; 364/151, 150, 191, 193, 148–149, 513, 192, 167, 171; 901/4

[56] References Cited

U.S. PATENT DOCUMENTS

| | | | |
|---|---|---|---|
| 4,300,198 | 11/1981 | Davini | 318/568 X |
| 4,305,028 | 12/1981 | Kostas | 318/568 X |
| 4,362,978 | 12/1982 | Pollard | 318/568 |

FOREIGN PATENT DOCUMENTS

| | | |
|---|---|---|
| 1234941 | 6/1971 | United Kingdom . |
| 1408666 | 10/1975 | United Kingdom . |
| 1465293 | 2/1977 | United Kingdom . |
| 1481134 | 7/1977 | United Kingdom . |
| 1518244 | 7/1978 | United Kingdom . |
| 1534167 | 11/1978 | United Kingdom . |
| 1532927 | 11/1978 | United Kingdom . |
| 2087107 | 5/1982 | United Kingdom . |

Primary Examiner—William M. Shoop, Jr.
Assistant Examiner—Patrick C. Keane
Attorney, Agent, or Firm—Fleit, Jacobson, Cohn & Price

[57] ABSTRACT

During demonstration of a job sequence by an operator, an image error signal generated by a camera raster, is fed into a register, where it corrects the actual raster position, which is then stored in a data store. A tachometer signal from a joint of a model of a robot arm being manipulated by the operator is subtracted from a corresponding tachometer signal on the robot arm and passed to a processor.

The processor uses an iterative procedure to evaluate a set of constants from the tachometer signals from the model. The servo signals are subsequently used to enable the robot arm to repeat the job sequence.

5 Claims, 1 Drawing Figure

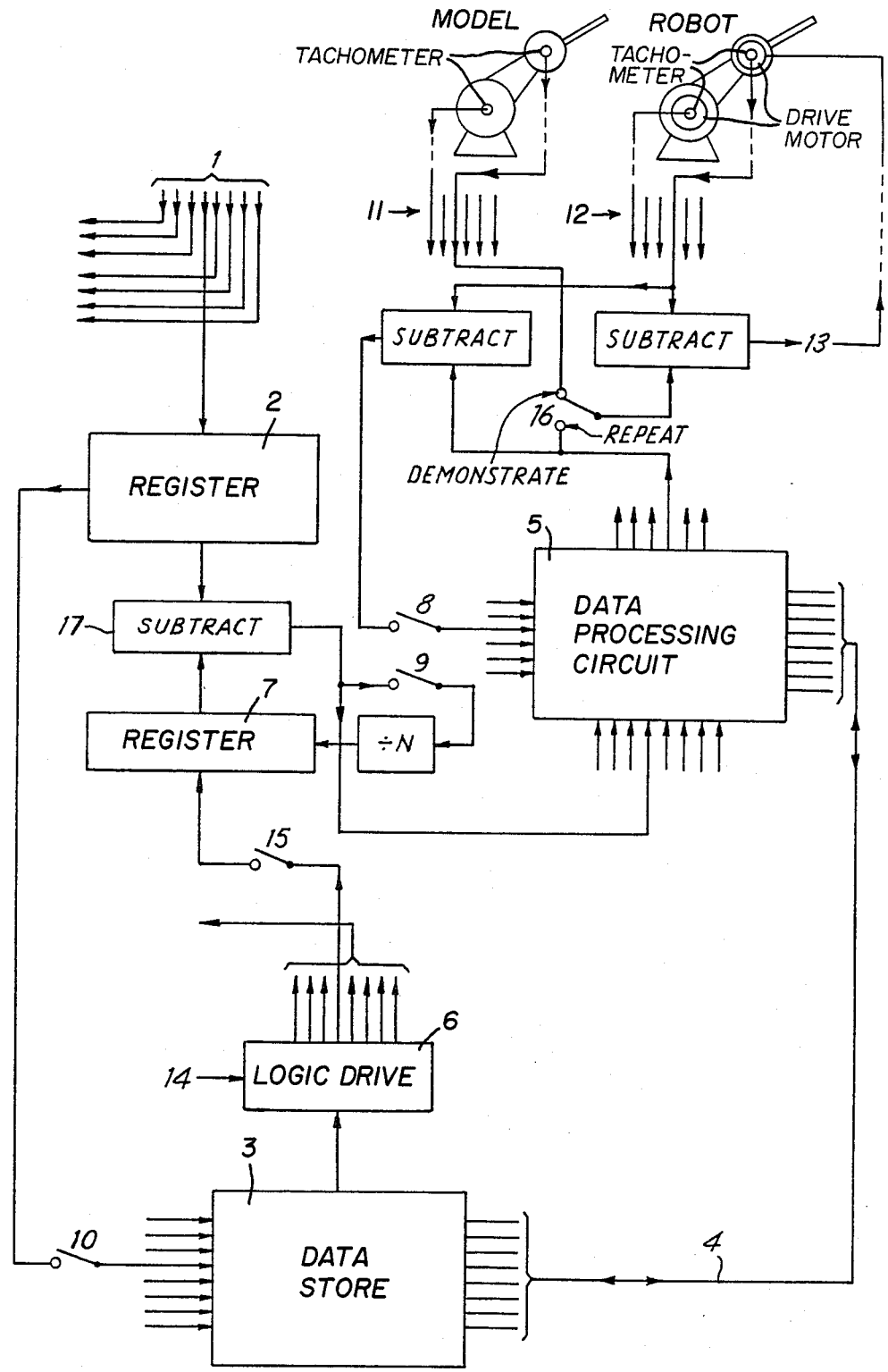

ROBOT CONTROL SYSTEMS

This invention relates to robot control systems and in particular, though not exclusively, to such a system wherein the robot can be programmed by an operator who demonstrates a job sequence.

In a robot control system of this kind, the operator moves an object through a series of movements, which the robot will be required to repeat, in the field of view of a camera, by means of which the robot senses and stores information indicative of the image or pattern formed by the object. The camera differs from most television cameras, in that it has a scan raster which is variable in shape, size and orientation, and is preferably, although not essentially, formed of two sets of scan lines approximately at right angles to each other as described, for example, in Great Britain Pat. No. 1234941 (herein GB 1234941). Once the image information has been stored, it may be compared and matched with new image information.

During subsequent repetition of the job sequence by the robot, these error signals so derived are used to control the movement of the object by the robot, instead of the movement of the camera raster. The error signals therefore need to be transformed from the raster co-ordinate system to the robot co-ordinate system and compared with position signals derived from position sensors on each joint of an arm of the robot, which is required to be manipulated in order to move the object.

If the arm has, for example, six degrees of freedom, so that six servo controls are required, which are controlled by, say, eight error signals derived from the image, then at least forty-eight trigonometrical expressions need to be evaluated, which further require at least six parameters derived from the position sensors on the arm.

These evaluations may be carried out by a processor connected to the arm of the robot. However, it can clearly be envisaged that such evaluation could easily become a complicated and lengthy operation.

It is therefore an object of the invention to provide an improved robot control system which substantially simplifies any required evaluation therewithin.

According to the present invention there is provided a robot control system, wherein a robot can be programmed by demonstration to repeat a job sequence, comprising a model of the robot, or of a part thereof, which can be moved into a desired position during demonstration of the job sequence, said model generating at least one signal indicative of the desired movement, means for utilising said signal, or signals, to evaluate data which can be used to generate servo signals substantially equivalent to the first-mentioned signal, or signals, generated by said model, means for storing the data in accordance with the job sequence, and means for utilising said data to generate said servo signals, said servo signals being used to cause repetition of the desired movement by the robot.

The model is preferably of a jointed arm of the robot, which is required to be manipulated. Each joint is provided with a tachometer and, during demonstration of the job sequence by an operator, the tachometers can be connected to robot servos.

Each corresponding joint of the actual arm of the robot is provided with a drive motor and a tachometer. These tachometers are connected to provide velocity feedback and can balance the tachometers on the model, so that any angular movement which the operator gives to the model can be reproduced by the arm. Such a system, however, is subject to slow drift, so that the drive motors need to be switched off during breaks in programming.

As the arm moves during the demonstration, a raster on a camera associated with the robot is allowed to follow a visible image of an object being moved by the arm.

As the raster follows the motion demonstrated by the operator, eight image error signals are generated, which hold the raster in position. At substantially the same instant, the operator, by manipulating the model, produces six tachometer signals which can be used, instead of the error signals, to operate the servo controls of the arm. A procedure is carried out by a processor to evaluate a function which relates the image error signals to servo signals needed to drive the motor of each joint at the speeds dictated by the demonstration at each instant.

The positions of the raster throughout the demonstration are recorded. When the robot is required to repeat the job sequence, subsequent to the demonstration, the raster is allowed to follow the image of the object and the difference between the raster position and the recorded position now forms the primary error signals, and the functions which were evaluated by the above-mentioned procedure are used to transform these primary error signals into the servo signals.

In accordance with the invention, at any particular position of the arm of the robot, each of the six tachometer signals can be replaced by a sum of eight constants, each multiplied by an image error signal. Each of the six tachometer signals requires a different set of eight constants, so that forty-eight constants are required. However, these constants have replaced the forty-eight trigonometrical expressions which were required to be evaluated heretofore, thus, use of the system in accordance with the present invention results in substantial simplification of the required evaluation.

These constants only apply to one attitude of the arm and must be altered for subsequent movements thereof. However, the values of the constants are not critical, so that the processor can re-evaluate them by means of an iterative technique as changes in the image error signals and tachometer signals provide new data.

For any one position of the arm, an arbitrary set of eight constants may easily be chosen by the processor, so that $$\sum_{n=1}^{n=8} A(n)X(n)$$

gives the required value of servo signal for each servo-controlled joint of the arm, where A(1), A(2), ... A(8) are the estimated chosen constants and X(1), X(2), ... X(8) are the image error signals. The value of each servo signal is correct if it is substantially the same as the tachometer signal produced by a respective joint of the robot arm which, in turn, is the same as the tachometer signal produced by the corresponding joint of the model used to control the robot arm.

It is assumed that the general position of the arm is not changing significantly during any particular evaluation, so that the forty-eight values can be considered as constants.

Therefore, during demonstration, the operator moves the model of the arm, which generates tachometer signals and the processor evaluates a set of constants which, when multiplied by the image error signals, sum in sets of eight to give servo signals, which equal the tachometer signals and which can therefore be fed to the servo controls in substitution for the tachometer signals.

These constants are then stored against a stored indicium for that image, so that when the robot comes to the part of the job sequence wherein that particular image is required, the constants can be taken from the store and used to produce the correct servo signal.

It can be seen that this system in accordance with the invention is further advantageous in that position sensors on the arm of the robot are no longer required, as the evaluation of the trigonometrical expressions which require parameters from those sensors is also no longer necessary.

The invention will now be further described by way of example only with reference to the accompanying diagram, the single FIGURE of which shows a schematic circuit arrangement of a preferred embodiment of the invention.

Referring to the FIGURE, an input of eight image error signals generated by a camera raster (not shown) are shown at 1, one of these signals being fed into a "raster position" register 2. The image error signals are derived from a comparison between an image viewed through the camera and a stored image as described, for example, in GB 1234941. Where, in the figure, only one signal from a set of six or eight similar signals is shown as being fed into, or from, a particular part of the circuit arrangement, it implies that each of the remaining signals of that set is being fed separately to, or from, an equivalent part of the circuit arrangement. Consequently, the following description of the operation of the circuit shown in the FIGURE is basically for only one of the eight image error signals and one of six tachometer signals generated by movement of a model of an arm of the robot (not shown in the FIGURE).

During demonstration by an operator, switches 8, 9 and 10 are closed, switch 15 is opened, and switch 16 is set to "demonstrate". The image error signal 1 is fed into the "raster position" register 2, where it corrects the actual raster position, which is then stored in a data store 3, as part of an indicium for that particular image or pattern at that particular stage in the job sequence, as disclosed in British Pat. No. 1,234,941, the disclosure of which is incorporated herein by reference. A tachometer signal 11 from a joint of the model arm, which is being manipulated by the operator, is subtracted from a corresponding tachometer signal 12 from the robot arm and a difference signal 13 is used to servo the robot arm into its intended position. The tachometer signal 12 is also passed via a subtract circuit, which acts as a short circuit in the "Demonstrate" mode, and switch 8, which is closed in the "Demonstrate" mode, to a processor 5 where it is compared with a tachometer signal derived from image error signals passed to processor 5, as described hereinafter.

The image error signal 1 is provided with a second register 7, which during demonstration is made to follow the "raster position" register 2 after a predetermined time delay. This delay is provided by adding to register 7 a portion of the difference between the value in register 7 and the value in register 2, the difference being determined by subtracting register 17. The difference is passed, via switch 9, and divided by a predetermined constant N, before being passed back into register 7.

If, for example, N=2, then one half of the difference would be added at regular intervals into register 7, which would thus follow register 2 at a time delay equal to two addition intervals.

This procedure is convenient in practice, because the image error signal, although small, is not constant and is thus not itself particularly suitable as an input to the processor 5. However, the difference between the two registers represents a substantially smoothed value of the image error signal for a particular raster position, which can also be held in subtracting register 17, until it is required by the processor 5.

As described hereinbefore, processor 5 receives six tachometer signals for each position of the robot arm. The processor also receives, from circuit 17, eight smoothed image error signals, generated as described in the immediately preceding paragraph. The processor evaluates an aforementioned set of eight constants (A(1), A(2) ... (A(8)) such that when each constant is multiplied by a respective image error signal (X(1) X(2) ... X(8)) and the eight products are summed, a tachometer signals is produced which is substantially equal to the tachometer signal supplied to the processor by the robot arm. As described hereinbefore, a set of eight constants may easily be chosen initially by the processor and adjusted iteratively to obtain the required tachometer signal. Each set of eight image error signals is used to derive six sets of eight constants, each set corresponding to a different tachometer signal generated by the robot arm.

This procedure is repeated for the complete job sequence, which is stored in the data store 3, the constants being iteratively up-dated at regular intervals by the processor 5 and stored in the data store 3.

In order that the arrangement may be rendered capable of withstanding any additional errors caused by indirect movement from one desired position of the model of the arm to another desired position thereof, it may be necessary to move the model in all directions for a substantial period of time during the demonstration.

When the demonstration is complete, switches 8, 9 and 10 are opened, switch 15 is closed, and register 7 becomes a "desired position" register. The switch 16 is then set to "repeat." As described in the aforementioned British Pat. No. 1,234,941, the raster position is stored as part of the indicium for each image or pattern in the job sequence. When the robot is required to repeat the job sequence, the desired raster positions stored in the data store 3 are fed, via a logic drive 6 with a clock input 14 to regulate the feeding of the data, to the "desired position" register 7, so that the value in register 7 is regularly up-dated for each stage of the job sequence.

At substantially the same time, the image error signal 1 regularly up-dates the actual raster position in register 2, which is then subtracted from the desired raster position in register 7 to produce an error signal, which is then inverted and fed to processor 5.

The data store 3 also feeds the processor 5, via connection 4, with the corresponding set of constants, which are used in conjunction with the error signals to generate the servo signals, which are used to drive the motors on the servo-controlled arm. These servo signals are subtracted from the velocity feed-back signals 12 from tachometers on the arm, and the difference therebetween is fed, via 13, to motors of the arm, which is thus manipulated in the correct direction at the correct speed, in accordance with the job sequence.

The signals 12 providing velocity feedback therefore constrain the motors to drive at a speed proportional to the difference between the actual raster position in register 2 and the desired raster position in register 7, multiplied by the corresponding stored constants.

The ratio between the signal passed to each servo control by the processor and the feedback from each tachometer determines the distance by which the actual raster position lags behind the desired raster position, which may be expressed as a servo time constant.

The desired raster position need not be up-dated very often provided that the time interval between each up-date is a relatively small fraction of the servo time constant. The servo-control is preferably made to replace a human operator, so that up-dating every five milliseconds would be substantially adequate. However, the actual raster position needs to be up-dated every few tens of microseconds to avoid any noticeable loss of performance.

The "raster position" register 2 represents any one of eight registers holding the actual raster position and corresponding to the eight image error signals. There are also eight "desired position" registers, which could be made part of the processor 5, and the drive logic 6 could be made as part of the data store 3. However, due to the frequency at which the "raster position" registers require to be up-dated, these should be kept separate and need to be made from dedicated hardware.

An "if" instruction may also be incorporated into the demonstrated job sequence by insertion of a sub-routine and an indication that if a certain situation is recognised, the sub-routine should be initiated.

The model arm, which is manipulated by the operator during demonstration of the job sequence, may include resilient means, such as springs, so as to permit considerably easier movement of the model by the operator.

Additionally, a keyboard (not shown) may be provided, so that the operator can label each stored pattern with the name of an object as it is being manipulated by the model arm.

It will be appreciated by persons skilled in the art that alternative circuit configurations to the preferred arrangement, which substantially implement the present invention, may be envisaged.

As an alternative to the utilisation of tachometers for generating signals indicative of the movement of the model arm, it may be preferable to use a system of joysticks to provide signals indicative of velocities of the model during each stage of the demonstration.

I claim:

1. A system for controlling a robot, the system comprising means for generating, in a teaching mode, respective data signals related to successive intended positions of a part of the robot as established by demonstration of a desired job sequence, means for generating, in the teaching mode, corresponding tachometer signals related to drive signals effective to position said part successively at said intended positions, and processing means for generating respective transformation signals for translating each said data signal into a corresponding said tachometer signal, and being operable, in a working mode, to apply said transformation signals successively to respective data signals generated during a repeat of the desired job sequence thereby to generate corresponding tachometer signals, and wherein means are provided to compare the tachometer signals generated by said processing means, in the working mode, with tachometer signals produced by the robot, in the working mode, and to servo said part into said intended positions, in accordance with the desired job sequence, in dependence on the comparision.

2. A system according to claim 1 wherein the means for generating a said data signal comprises first means for storing a first electrical signal related to visual representation of said part of a robot at one position thereof, second means for storing a second electrical signal related to a visual representation of said part of the robot at a different position thereof and means for comparing the electrical signals stored in said first and second means to evaluate said data signal.

3. A system according to claim 2 including third means for storing, in sequence, first electrical signals, routed successively to said first means during a demonstration of a job sequence, together with corresponding transformation signals, said third means being arranged to route said first electrical signals and the corresponding transformation signals, in sequence, respectively to said second means and to said transformation means during a repeat of the job sequence.

4. A system according to claim 1 wherein the means for generating a said drive signal includes a model of the robot for controlling movement of said part during a demonstration of the desired job sequence, means for deriving respective tachometer signals representing movement of the model and of said part of the robot and means for comparing the tachometer signals to generate said drive signal.

5. A system according to claim 2 wherein each said data signal comprises a plurality of component signals $X(1) \ldots X(N)$, where N is an integer, and said transformation means is arranged to evaluate a corresponding plurality of transformation signals $A(1) \ldots A(N)$ such that the corresponding transformation signal is given by $$\eta \sum_{n=1}^{N} A(n)X(n).$$

* * * * *